Patented Mar. 17, 1953

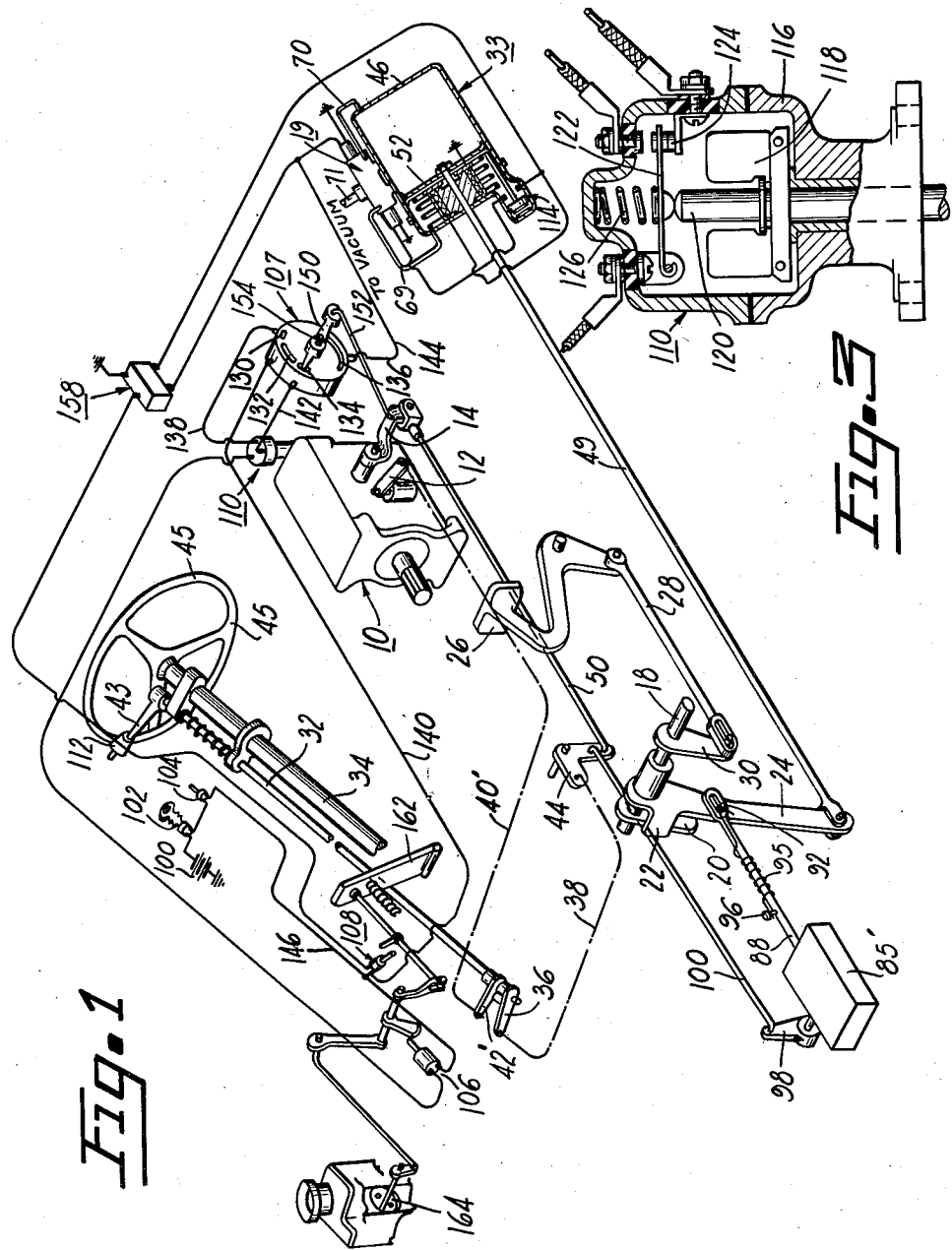

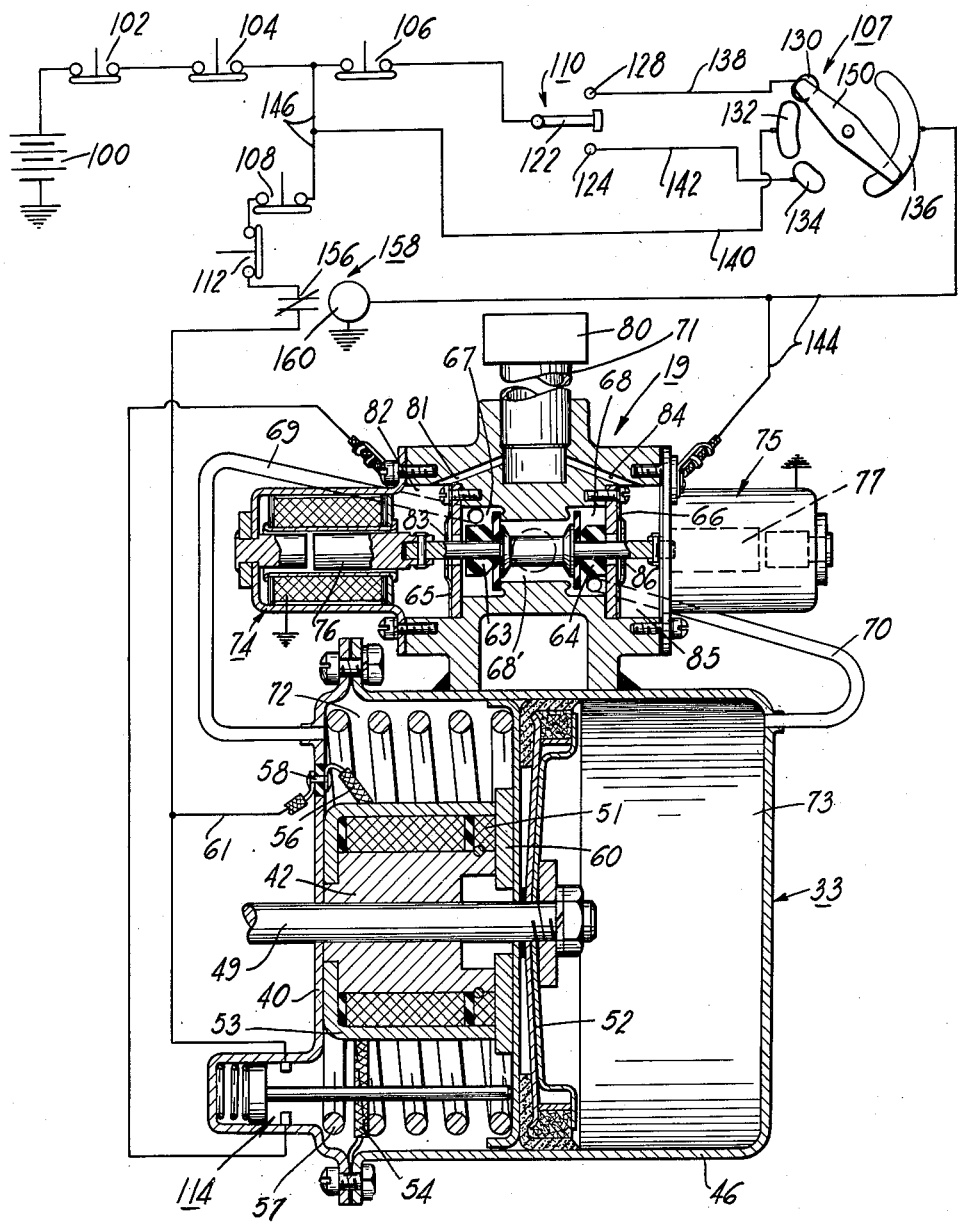

2,631,701

UNITED STATES PATENT OFFICE 2,631,701

TRANSMISSION OPERATING MECHANISM

George O. Ainsworth and Edwin E. Prather, South Bend, Ind., assignors to Bendix Aviation Corporation, South Bend, Ind., a corporation of Delaware Application May 14, 1949, Serial No. 93,354

12 Claims. (Cl. 192—.073)

This invention relates in general to the power transmission mechanism of an automotive vehicle and in part to means for operating the change speed transmission and the friction clutch of said mechanism.

One of the objects of our invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, and the operation of the friction clutch to facilitate said settings, being effected by power means if the driver elects this operation of the mechanism.

A further object of the invention is to provide, in an automotive vehicle including a friction clutch and a three speeds forward and reverse transmission, means, automatically operative in a cycle of operations, for operating and for facilitating the operation of said transmission including power means, comprising a double acting spring and pressure differential operated motor, which is automatically operable, after the accelerator is released, to establish the transmission either in its second gear setting or its high gear setting depending upon the speed of the vehicle, the friction clutch being operated by said motor to facilitate this operation of the transmission, said first-mentioned means further including manually operated means for effecting any one of the gear settings of the transmission.

A further object of our invention is to provide, in the power plant of an automotive vehicle provided with a change speed transmission, power means, including a double acting pressure differential and spring operated motor, for shuttling the transmission between two settings thereof; and an important object of our invention is to so construct this power means as to make possible, at the will of the driver and when the vehicle is travelling above a certain speed, one of the settings of the transmission by the operation of the power means.

Yet another object of our invention is to provide a simple and compact double acting spring and pressure differential operated motor unit well adapted for use in power mechanism for operating the change speed transmission of an automotive vehicle.

The above and other objects and features of the invention will appear more fully hereinafter from a consideration of the following description taken in connection with the accompanying drawings where one embodiment of the invention is illustrated by way of example.

Figure 1 is a diagrammatic view of our invention disclosing the principal features thereof;

Figure 2 is a view disclosing the wiring diagram of the electrical mechanism disclosed in Figure 1; and said view also discloses details of the spring and pressure differential operated motor unit of our invention; and Figure 3 is a view disclosing details of the governor operated switch unit of Figure 1.

Referring now to Figure 1 disclosing a preferred embodiment of the invention, a three-speeds forward and reverse transmission 10 is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

This invention has to do with the manually and power operated means for actuating the aforementioned transmission operating cranks 12 and 14 and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of our invention preferably includes, in the power plant of the vehicle, a fluid coupling such for example as that which was incorporated in several 1941 and 1942 passenger vehicles, and said coupling includes an impeller and a vaned rotor the latter serving to drive the aforementioned driving plate of the clutch.

The friction clutch, not shown, is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost-motion type to obviate a movement of the clutch pedal when the clutch is power operated by the mechanism described hereinafter.

The shift rail operating cranks 12 and 14 are actuated by force transmitting means including a rotatable and bodily movable shaft 32 extending alongside the steering column 34 of the vehicle. A shift lever 43, mounted beneath the steering wheel 45 of the vehicle, is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32 is also such that the cross-shift movement of the shift lever, that is the movement in a plane perpendicular to the plane of the steering wheel, results in a bodily movement of the shaft 32 to effect a shift rail selecting operation of the crank 12. In these operations the rotation of the shaft 32 effects an angular movement of a crank 36 which is connected to the transmission operating crank 14 by a link 38, a bell crank lever 44, and a link 50; and the bodily movement of the shaft 32 effects an angular movement of a crank 42' which is connected to the transmission operating crank 12 by a link 40'.

There is thus provided, by the above described mechanism, means for manually operating a three speeds forward and reverse transmission; and in this manual operation of the transmission the shift lever 43 is movable to five different positions, said selective movement outlining the letter H.

Describing now the power means for operating the transmission and clutch, the principal element of this power means consists of a double-acting fluid pressure and spring operated motor unit 33 operably connected to the clutch throwout shaft 18 and to the shift rail operating crank 14; and said motor is controlled by a solenoid operated double three-way valve 19. The motor unit 33 constitutes an important feature of our invention and preferably includes a cup-shaped casing 46.

To the peripheral portion of the casing there is detachably secured a plate 40 constituting the end wall of the motor unit; and to the inner face of said wall there is secured an electromagnet constituting a holding coil for the piston 52 of the motor unit, the operation of said electromagnet being referred to hereinafter. This electromagnet includes an iron core 42 bored to receive a rod 49 extending through the plate 40; and this rod 49 is fixedly secured at one of its ends to the central portion of the piston 52 and at its other end is connected to the crank 24. The electromagnet further includes a winding 51 housed between the outer surface of the core 42 and the inner surface of a cup-shaped housing member 53 secured to the plate 40. The winding 51 is grounded to the casing of the motor unit by a conductor 54 and is electrically connected, by a conductor 56, to a conductor 58 mounted in the plate 40. When the electromagnet is energized an armature plate 60 fixedly secured to the piston 52 is attracted toward the winding 51. The plate 60, core 42 and winding 51 together go to make up the electromagnet. The conductor 58 is insulated from the plate 40 and to said conductor there is connected a conductor 61; and the motor unit as a whole may be detachably secured by a bracket, not shown, to the chassis of the vehicle.

A spring 57, interposed between the end plate 40 and the piston 52, constitutes an important part of the power means of the motor unit 33 and serves to move the piston to the right, Figure 1, to successively effect a disengagement of the clutch and an operation of the transmission. When the piston 52 is moved to the left by a differential of pressures to which it is subjected, the energized electromagnet serves to hold the piston in its clutch engaged position, that is the position disclosed in Figures 1 and 2; and in this position the spring 58 is compressed in preparation for a subsequent expansion thereof to disengage the clutch and operate the transmission.

The valve mechanism 19 of the motor unit is disclosed in detail in Figure 2 and includes a casing 62 cooperating with valves 63 and 64 and plates 65 and 66 to provide compartments 67, 68, and 68' connected, respectively, by conduits 69, 70, and 71, Figure 1, to a compartment 72 of the motor, a compartment 73 of the motor, and a source of vacuum, preferably the intake manifold of the engine of the vehicle, not shown. Grounded solenoids 74 and 75 are mounted on the valve casing 62 and the armatures 76 and 77 of said solenoid are connected, respectively, to the valves 63 and 64. The two armatures are connected, at their inner ends, to a spool shaped member, which extends through the vacuum compartment 68'.

Describing now the operation of the motor unit 33, which includes both the cylinder 46 and the valve mechanism 19, an energization of the solenoid 75 results in an opening of the valve 64, Figure 2, and a closing of the valve 63 to connect the motor compartment 73 to the source of vacuum and vent the compartment 72 of the unit to the atmosphere via an air cleaner 80, a duct 81 in the valve casing, a valve compartment 82 and an opening 83 in the plate 65. The piston 52 is thus subjected to a differential of pressures to move the same to the right, Figures 1 and 2, to scavenge the air from the motor compartment 73 to facilitate the expansion of the spring 57 in its operation of disengaging the clutch and operating the transmission; and this pressure differential operation of the piston also serves, by virtue of the force exerted by the piston, to add to the transmission and clutch operating force exerted by the spring.

When the piston reaches the end of its stroke in this operation, or is just about to reach this position, the mechanism is operative to energize the solenoid 74 and de-energize the solenoid 75; and this operation of the solenoids results in a reversal of the direction of movement of the valves 63 and 64 the latter being seated in a closing operation and the former being opened. The motor compartments 72 and 73 are thus connected respectively to the vacuum and air to subject the piston to a differential of pressures to move the same to the left, Figures 1 and 2, to compress the spring 57 and permit a re-engagement of the clutch. In this operation the motor compartment 73 is vented to the atmosphere via the air cleaner 80, a duct 84 in the valve casing, a compartment 85, and an opening 86 in the plate 66; and the motor compartment 72 is connected to the source of vacuum by the conduit 69, the valve compartments 67 and 68' and the conduit 71.

Continuing the description of the power means of our invention the crank 24 is yieldingly connected to an alternator 85 by means preferably including a pin 92 extending from the crank. One end of a spring 94, preferably coiled around a link 88, is connected to a pin 96 secured to said link; and the other end of said spring is fastened to the pin 92. The incorporation of the spring 95 in the connection between the crank 24 and the link 88 provides a mechanism making it possible to disengage the clutch prior to an operation of the transmission. A crank 98 of the alternator is pivotally connected to the bell crank lever 44 by a link 100. The alternator 85', which may be of any well known design, is not described in detail inasmuch as said unit of itself constitutes no part of our invention. Suffice it to say that this mechanism provides a means whereby successive movement of the power input link 88 in one direction results in a reciprocatory angular movement of the power output crank 98 of the alternator mechanism; and this reciprocatory movement of the crank 98 results in a corresponding reciprocatory movement of the transmission operating crank 14 to successively establish the transmission in its second and high gear settings.

There is thus provided an alternator or oft called direction changing means whereby the transmission operating angular movement of the crank 14 is alternately reversed with each successive transmission operating energization of the motor unit 33.

As to the electrical means for controlling the operation of the motor unit 33, said means includes the parts disclosed in Figures 1 and 2; and this electrical means includes a grounded battery 100, the ignition switch 102 of the car, a cut off switch 104, an accelerator operated breaker switch 106 which is closed when the accelerator is completely released and opened when the accelerator is depressed, a motor operated selector switch mechanism 107, a normally closed accelerator operated breaker switch 108 which is broken when the accelerator is depressed to its wide open throttle position, a vehicle speed responsive governor operated single pole double throw switch mechanism 110, a shift lever operated overrule switch 112, a piston operated breaker switch 114 which is opened when the piston is in its clutch engaged position, and the aforementioned grounded solenoids 74 and 75 which operate the motor controlling valve 19. The aforementioned switches are electrically interconnected as disclosed in Figure 2 and of said switches the accelerator operated switches 106 and 108, the cut off switch 104, the piston operated switch 114, and the overrule switch 112 are of conventional breaker switch construction, accordingly, the same are not disclosed in detail.

Describing the governor operated switch mechanism 110 disclosed in detail in Figure 3 this mechanism includes a two part casing 116 housing a centrifugally operated governor mechanism 118 which is drivably connected to the propeller shaft of the vehicle or some other moving part of the power plant, the speed of which is directly proportional to the speed of the vehicle. A thrust member 120 of the centrifugal mechanism contacts the central portion of a movable switch contact member 122 which is biased into engagement with a fixed contact 124 by a spring 126. The parts of this switch mechanism are so constructed and arranged and so operative that when the vehicle is at a standstill or is travelling at or below a relatively low speed, for example 10 M. P. H., then the spring 126 serves to move the movable contact member 122 into engagement with the fixed contact 124; and when the vehicle is travelling at or above governor speed, say 11 M. P. H., then the centrifugally operated mechanism 118 is operative to force the contact 122 into engagement with a fixed contact member 128. Completing the description of the governor switch mechanism 110 the other end of the movable contact member 122 is electrically connected to a conductor which is connected to the accelerator operated switch 106.

Describing now the switch 107 and its electrical connection with the remainder of the control mechanism, said switch comprises a casing having secured thereto fixed contacts 130, 132, 134, and 136 connected respectively, by conductors 138, 140, 142, and 144 to the fixed contact 128 of the governor switch, to a conductor 146 interconnecting the cut off switch 104 and the accelerator operated switch 108, to the fixed contact 124 of the governor switch 110 and to the conductor 144 which is connected to the grounded solenoid 45. Completing the description of the motor operated selector switch 107 there is provided a movable contact 150 which is connected to the transmission operating crank 14 by a link 152; and the contact member 150 is pivotally mounted upon a pin 154 extending from the switch casing. The movable contact 150 and three fixed contacts 130, 132, and 134 of the switch 107 provide three separate switches 130, 150; 132, 150; and 134, 150.

Completing the description of the electrical means for controlling the motor unit 33, a normally closed switch 156 of a relay 158, together with the breaker switches 114, 112 and 108 serve to interconnect the grounded solenoid 74 and the aforementioned conductor 146; and the grounded winding 160 of the relay 158 is electrically connected to the conductor 144, said winding and the solenoid 75 being electrically connected in parallel with each other as is disclosed in Figure 2. The grounded winding 51 of the electromagnet 51, 60 within the motor unit 33 is also electrically connected to the relay switch 102 all as is disclosed in Figures 1 and 2.

Briefly describing the operation of the power and manually operated transmission operating mechanism of our invention the driver may operate the transmission 10 manually by opening the switch 104 thereby disabling the power means of our invention. The shift lever 43 is then operated manually to operate the transmission the clutch being operated by the pedal 26 to make this operation of the transmission possible.

Should the driver wish to power operate the transmission to shuttle the same between its second and high gear settings he will first close the cut off switch 104; and it is assumed that at this time the engine is idling to make of the intake manifold a source of vacuum; that the transmission is at the time established in its second gear setting; and that the friction clutch is engaged. The accelerator 162 will then be depressed to open the throttle 164 to get the car under way and when the car speed reaches 11 M. P. H. the driver will release the accelerator thereby closing the switch 106. The governor switch 122, 128 is at this time closed accordingly an electrical circuit is then completed to effect an energization of the solenoid 75 and the winding 160 of the relay 158. This circuit includes the grounded battery 100, the ignition switch 102, the cut off switch 104, the closed accelerator switch 106, the governor switch 122, 128, the switch 130, 150 of the selector switch mechanism 107, and the grounded solenoid 75 and grounded relay winding 160.

At this juncture it is to be noted that the switch 130, 150 of the motor operated switch 107 is closed when the transmission is established in its second gear setting; and the switch 134, 150 is closed when the transmission is established in its high gear setting. It is also to be noted that the switch 132, 150 of the switch mechanism 107 provides electrical means for maintaining an energization of the solenoid 75 once the operation of the motor 33 is initiated and despite an untoward depression of the accelerator to open the switch 106; then just as the transmission operating operation of the motor 33 is completed the switch 132, 150 is opened thereby de-energizing the solenoid 75. The governor operated switch 110 and the motor operated selector and cut off switch 107 are thus electrically connected in series-parallel in the electrical connection interconnecting the grounded battery and the grounded solenoid 75.

Continuing the description of the operation of the mechanism of our invention to establish the transmission in its high gear setting, the passage of the current through the relay winding 160 serves to close the relay 158 thereby opening the relay switch 156; and this operation serves to de-energize the holding coil 51. The concurrent energization of the solenoid 75 serves to open the valve 64 thereby connecting the compartment 73 of the motor 33 to the source of vacuum.

The motor 33 is, by the above described operation of the electrical controls, prepared for a spring operation thereof, accordingly, the spring 57 then immediately expands to move the piston 52 to the right, Figure 1, to successively disengage the clutch and establish the transmission in its high gear setting. Now just as the operation of establishing the transmission in high gear is being completed the switch 132, 150 is opened thereby effecting a de-energization of the solenoid 75 and a re-energization of the solenoid 74; and this operation serves to again vacuum energize the motor unit 33 to move the piston to the left, Figure 2, to cock the spring 57 and at the same time permit the clutch spring, not shown, to re-engage the clutch.

When the latter operation is completed the piston operated switch 114 is opened to de-energize the solenoid 74 thereby preventing a waste of battery current between operation of the mechanism; however, the holding coil 51 takes over the control to hold the piston 52 in its clutch engaged position and the spring 57 in its cocked condition.

There is thus provided a spring and pressure differential operated motor operable, by a spring and vacuum operation thereof, to successively disengage the clutch and operate the transmission and further operable, by a vacuum operation thereof, to assist the re-engagement of the clutch and prepare the mechanism for a subsequent operation of the clutch and transmission. The power element 52 of the motor 33 is actuated in one direction by the differential of pressures acting upon said element; and said power element is actuated in the other direction by the spring 57 and the differential of pressures acting thereon.

The cycle of operations of the clutch and transmission having been completed to establish the transmission in its high gear setting the driver will depress the accelerator to maintain or increase the speed of the vehicle. Then should the driver wish to effect what is known as a kickdown operation of the transmission, that is a second gear operation of the transmission when the vehicle is travelling in high gear above governor speed, he need but depress the accelerator to its wide open throttle position to open the breaker switch 108; and this operation serves to de-energize the holding coil 51 thereby releasing the spring 57 to effect the desired second gear setting of the transmission. This operation of the transmission is often employed when it is desired to quickly pass a car on the road or to expedite the climbing of a hill. It is also to be noted that, if desired, a throttle closing mechanism may be included in the mechanism of our invention thereby providing means for automatically closing the throttle during the period of time when the motor 78 is operating to operate the clutch and transmission and despite the depression of the accelerator.

The kickdown operation of the transmission may also be effected by an opening of the switch 112, which, as described above, is conveniently mounted on the gear shift lever 43.

To effect a down shift, that is second gear operation of the transmission in the normal operation of the car the driver will slow the vehicle down to governor speed, for example the 11 M. P. H. speed suggested above; and this operation, together with a release of the accelerator to close the switch 106, serves to effect an energization of the solenoid 75 and a closing of the relay 158 to open the relay switch 156. There results, from this operation, the same spring and vacuum energization of the motor described above, said operation serving to successively disengage the clutch and establish the transmission in its second gear setting; and, as described above, just as this operation is completed or is about to be completed the switch 132, 150 is broken thereby effecting an energization of the solenoid 74 and a de-energization of the solenoid 75. The resultant vacuum energization of the motor unit again effects a cocking of the spring 57 to prepare the motor for a subsequent operation; and permits an expansion of the clutch springs to re-engage the clutch.

There is thus provided a simple and compact manual and power operated mechanism for operating a three-speeds forward and reverse transmission of the power plant of an automotive vehicle. The driver may, at will, either operate the transmission manually to effect all of its settings or he may effect the low, the reverse, and the neutral settings manually and the second and high gear settings by power. The spring operation of the motor 33 provides means for effecting a second gear operation of the transmission regardless of the degree of vacuum within the intake manifold; and the accelerator or shift lever operated kickdown operation, or what may be termed overrule operation of the mechanism, provides means for effecting a second gear operation of the transmission when the vehicle is travelling in high gear and above governor speed.

It is also to be noted that the motor unit 78 and control means therefor may, if desired, be employed to operate a two speed axle transmission or other two speeds forward transmission of an automotive vehicle.

Although only one embodiment of the invention has been illustrated and described, various changes in the form and relative arrangements of the parts may be made to suit requirements.

We claim:

1. Control mechanism adapted to control the operation of the friction clutch and the change speed transmission of the power plant of an automotive vehicle including a double acting pressure differential and spring operated motor adapted to be connected to the transmission and clutch, said motor including a power element and further including a spring operative to bias said element to a certain position, the motor being spring and vacuum operated to successively disengage the clutch and operate the transmission and immediately thereafter, in the cycle of operations, power operated to effect an engagement of the clutch and prepare the motor for a subsequent transmission operating operation; means, including valve means, for controlling the operation of the motor, and means for controlling the operation of the control means to effect the aforementioned cycle of operations.

2. Control mechanism adapted to control the operation of the change speed transmission of the power plant of an automotive vehicle including a double acting pressure differential and spring operated motor adapted to be connected to the transmission, said motor including a power element and further including a spring operative to bias said element to a certain position, the motor being spring and vacuum operated to operate the transmission and immediately thereafter, in the cycle of operations, power operated to prepare the motor for a subsequent transmission operating operation; means, including valve means, for controlling the operation of the motor; and means for controlling the operation of the control means to effect the cycle of operations.

3. Control mechanism adapted to control the operation of the friction clutch and the change speed transmission of the power plant of an automotive vehicle including a double acting pressure differential and spring operated motor adapted to be connected to the transmission and clutch by yieldable force transmitting means, said motor including a power element and further including a spring operative to bias said element to a certain position, the motor being spring and vacuum operated to successively disengage the clutch and operate the transmission and immediately thereafter, in the cycle of operations, power operated to effect a re-engagement of the clutch and prepare the motor for a subsequent transmission operating operation; means, including valve means, for controlling the operation of the motor; and means for controlling the operation of the control means to effect the aforementioned cycle of operations including a three-part selector switch mechanism operated by the motor, said switch mechanism serving, by a preselective operation, to prepare the mechanism for an operation of the transmission and clutch, and further serving to automatically cut off the operation of the mechanism when the transmission has been established in gear.

4. Control mechanism adapted to control the operation of the change speed transmission of the power plant of an automotive vehicle including a double acting pressure differential and spring operated motor adapted to be connected to the transmission, said motor including a power element and further including a spring operative to bias said element to a certain position, the motor being spring and vacuum operated to operate the transmission and immediately thereafter, in the cycle of operations, power operated to prepare the motor for a subsequent transmission operating operation; means, including valve means, for controlling the operation of the motor; and means for controlling the operation of the control means to effect the cycle of operations including a three-part selector switch mechanism operated by the motor, said switch mechanism serving, by a preselective operation, to prepare the mechanism for an operation of the transmission and further serving to automatically cut off the operation of the mechanism when the transmission has been established in gear.

5. Control means adapted to successively operate the friction clutch and the change speed transmission of the power plant of an automotive vehicle including a double acting pressure differential and spring operated motor comprising a power element, a spring for moving the power element in one direction to effect a disengagement of the clutch and an operation of the transmission, and an electromagnet operable to hold the spring cocked preparatory to effecting a spring operation of the clutch and transmission; means, including valve means, for controlling the operation of the motor including a valve operative to effect a vacuum operation of the motor to facilitate a spring operation thereof, and a valve operative to effect a vacuum operation of the motor to cock the spring.

6. Control means adapted to successively operate the friction clutch and the change speed transmission of the power plant of an automotive vehicle including a double acting pressure differential and spring operated motor comprising a power element, a spring for moving the power element in one direction to effect a disengagement of the clutch and an operation of the transmission, and an electromagnet operable to hold the spring cocked preparatory to effecting a spring operation of the clutch and transmissions; means, including valve means, for controlling the operation of the motor including a valve operative to effect a vacuum operation of the motor to facilitate a spring operation thereof and a valve operative to effect a vacuum operation of the motor to cock the spring, and means for controlling the operation of the valve means and the electromagnet including switch means operative to initiate the clutch disengaging and transmission operating operations of the motor and switch means automatically operative, when the transmission is established in gear, to initiate a clutch engaging and spring cocking operation of the motor.

7. Control mechanism adapted to successively operate the friction clutch and the change speed transmission of the power plant of an automotive vehicle including a double acting spring and pressure differential operated motor, spring and pressure differential operated to successively disengage the clutch and operate the transmission and then immediately thereafter, as a part of a cycle of operations, power operated to engage the clutch and prepare the motor for a subsequent operation of the transmission; means for controlling the operation of the motor including valve means and further including an electromagnet operative to hold the power element of the motor in a certain position; and means for controlling the operation of the valve means and the electromagnet to, in a cycle of operations, de-energize the electromagnet, disengage the clutch, operate the transmission and lastly re-engage the clutch and energize the electromagnet.

8. Control mechanism adapted to successively operate the friction clutch and the change speed transmission of the power plant of an automotive vehicle including a double acting spring and pressure differential operated motor which is spring and pressure differential operated to successively disengage the clutch and operate the transmission and is then, as a part of a cycle of operations, power operated to engage the clutch and prepare the motor for a subsequent operation of the transmission; means for controlling the operation of the motor including valve means and further including an electromagnet operative to hold the power element of the motor in a certain position; and means for controlling the operation of the valve means and the electromagnet, to, in a cycle of operations, de-energize the electromagnet, disengage the clutch, operate the transmission and lastly re-engage the clutch and re-energize the electromagnet, said latter control means being further operative, at the will of the driver, to effect a certain clutch and transmission operating operation of the motor when the vehicle is travelling above a certain speed.

9. Control mechanism adapted to successively operate the friction clutch and the change speed transmission of the power plant of an automotive vehicle including a double acting spring and pressure differential operated motor, spring and pressure differential operated to successively disengage the clutch and operate the transmission and then immediately thereafter, as a part of a cycle of operations, power operated to engage the clutch and prepare the motor for a subsequent operation of the transmission; means for controlling the operation of the motor including valve means and further including an electromagnet operative to hold the power element of the motor in a certain position; and means, including a plurality of valve operating solenoids and a plurality of switches for controlling the solenoids electrically connected in a series parallel hook-up, for controlling the operation of the valve means and the electromagnet to, in a cycle of operations, vacuum energize the motor, and de-energize the electromagnet, disengage the clutch, operate the transmission and lastly re-engage the clutch and re-energize the electromagnet.

10. Control mechanism adapted to successively operate the friction clutch and the change speed transmission of the power plant of an automotive vehicle including a double acting spring and pressure differential operated motor, spring and pressure differential operated to successively disengage the clutch and operate the transmission and then immediately thereafter, as a part of a cycle of operations, power operated to engage the clutch and prepare the motor for a subsequent operation of the transmission; means for controlling the operation of the motor including valve means and an electromagnet the latter being operative to hold the power element of the motor in a certain position; and means for controlling the operation of the valve means and electromagnet to, in a cycle of operations, de-energize the electromagnet, disengage the clutch, operate the transmission and lastly re-engage the clutch and energize the electromagnet, said control means including a plurality of grounded solenoids for operating the valve mechanism and means for controlling the operation of the solenoids including a switch mechanism operated by the accelerator of the vehicle and electrical means interconnecting one of the solenoids and the accelerator operated switch mechanism including a governor operated switch and a motor operated selector switch electrically connected in a series-parallel connection with each other.

11. A mechanism for automatically shuttling the change speed transmission of an automotive vehicle between two settings thereof including a double acting pressure differential and spring operated motor, spring and pressure differential operated to establish one of said settings and immediately thereafter power operated to prepare the motor for a subsequent spring and pressure differential operated operation; means, including two valve members, for controlling the operation of the motor one operation of the valve members serving to connect one end of the motor with a source of power and at the same time vent the other end of the motor to the atmosphere, and another operation of the valve members serving to connect the latter end of the motor to the source of power and at the same time vent the remaining end of the motor to the atmosphere; and means for controlling the operation of the control means to effect the aforementioned cycle of operations of the motor.

12. Control mechanism adapted to successively operate the friction clutch and the change speed transmission of the power plant of an automotive vehicle including a double acting spring and pressure differential operated motor, spring and pressure differential operated to successively disengage the clutch and operate the transmission and then immediately thereafter, as a part of the cycle of operations, power operated to engage the clutch and prepare the motor for a subsequent operation of the transmission; means for controlling the operation of the motor including valve means and further including an electromagnet operative to hold the power element of the motor in a certain position; and means, including a plurality of valve operating solenoids and a plurality of switches for controlling the solenoids electrically connected in a series-parallel hook-up, for controlling the operation of the valve means and the electromagnet to, in a cycle of operations, de-energize the electromagnet, disengage the clutch, operate the transmission and lastly re-engage the clutch and re-energize the electromagnet, said valve controlling means including a solenoid for operating one of the two valve members, another solenoid for operating the other of said two valve members, and means for controlling the operation of the two solenoids including switch means operative, in accordance with the speed of the vehicle, to effect an energization of one of the solenoids and a de-energization of the other solenoid to effect a spring and vacuum operation of the motor, said switch means being automatically operative, when the transmission operating operation of the motor is completed, to energize the latter solenoid and to de-energize the remaining solenoid to thereby initiate an operation of the motor to effect a vacuum and electrical operation thereof.

GEORGE O. AINSWORTH.
EDWIN E. PRATHER.

REFERENCES CITED

The following references are of record in the file of this patent:

UNITED STATES PATENTS

| Number | Name | Date |
|---|---|---|
| 1,467,765 | McMullin | Sept. 11, 1923 |
| 1,773,216 | Campbell | Aug. 19, 1930 |
| 1,864,103 | Tenbrook | June 21, 1932 |
| 1,911,599 | Bloxsom | May 30, 1933 |
| 2,098,691 | Neff | Nov. 9, 1937 |
| 2,187,824 | Britton | Jan. 23, 1940 |
| 2,208,828 | Adams | July 23, 1940 |
| 2,440,558 | Price | Apr. 27, 1948 |
| 2,447,730 | Britton | Aug. 24, 1948 |
| 2,455,933 | Iavelli et al. | Dec. 14, 1948 |
| 2,487,482 | Schotz | Nov. 8, 1949 |
| 2,492,923 | Moore et al. | Dec. 27, 1949 |